3,071,479
COMBINATION POLISHING AND CLEANING COMPOSITION
Hal Fulenwider, Jr., P.O. Box 3009, West Palm Beach, Fla.
No Drawing. Filed June 19, 1957, Ser. No. 666,774
8 Claims. (Cl. 106—10)

This invention relates to a combination cleaning and polishing composition, and more particularly to a paste wax composition which is adapted to simultaneously clean, polish, and wax a finished surface in a single operation.

Articles finished in lacquer or oleoresin enamels usually leave the manufacturers in good condition with a high luster and devoid of dirt, chalk, or grease. Upon aging, particularly in the case of finishes which are exposed to the elements, the finishes chalk, gather dirt and grease, and in general deteriorate in appearance. It is therefore necessary to clean and polish these finishes to restore their natural appearance. In addition, it is also desirable to add a protective wax coating to the finish so that the elements are unable to attack the finished surface.

Heretofore, it has been customary to carry out the step of cleaning and polishing the surface and the step of waxing the surface as separate operations. Separate compositions have been developed which are particularly adapted for these operations. It has been recognized that a composition which will clean and polish and at the same time wax a finished surface is highly desirable, since it would avoid these duplicating operations, each of which involves extensive rubbing of the surface.

Paste wax compositions have heretofore been provided which include both an abrasive for the purpose of cleaning and polishing the surface, and a wax for applying a wax film. Such compositions have not been entirely satisfactory, since the compositions are difficult to spread on a surface to be cleaned and waxed, and are difficult to buff. Furthermore, they give final wax films which are dulled by the presence of particles of abrasive and pigment embedded therein, rather than the high gloss finish desired, for example, on an automobile surface.

It is an object of this invention to provide a composition which may be applied to a soiled and deteriorated, protective coating to simultaneously clean and polish the coating while leaving thereon a wax film of high gloss, and more particularly to such a composition which is especially adapted for the cleaning and waxing of finished metal surfaces, for example, automobile finishes.

A further object is to provide a composition for applying wax to finished surfaces containing abrasive particles which assist in the cleaning and polishing of the surface, but which at the same time are rejected from the wax film and readily removed from the surface thereof.

Other objects of this invention and its various advantageous features will become apparent from the following description.

This invention is a result of my discovery that the presence of a silicone oil in a paste wax composition containing any one of the abrasives commonly used in polishing compositions causes the abrasive particles, as well as particles of pigment and grime cleaned from the surface, to be rejected from the wax film so that they can be readily removed therefrom merely by wiping the waxed surface with a polishing cloth. I believe that this effect of the silicone oil is due to a selective absorption, or to a surface adsorption of the silicone oil by the abrasive, combined with the incompatibility of the silicone oil with the wax in the composition. Regardless of the mechanism involved, I have found that in the case of each of the numerous embodiments of this paste wax composition which I have tested, the presence of the silicone oil causes the particles of the abrasive, pigment, and grime to be much more easily removed from the wax film and makes possible the buffing of the film to a higher gloss, than in the case of comparable compositions which do not contain a silicone oil.

Further, I have found that the silicone oil causes a reduction of the viscosity of many of the wax compositions when at an elevated temperature at which they are molten. Such viscosity reduction is highly desirable in production operations, since it expedites the filling of cans with the molten composition. Still another advantageous effect of the presence of silicone oil in the composition arises from the fact that it causes the majority of the wax compositions to spread more readily and evenly on a painted surface during the initial application of the compositions to the surface.

The composition, in accordance with this invention, is comprised of four essential ingredients. They are, a wax or mixture of waxes, a solvent, an abrasive, and a silicone oil. The four essential ingredients are contained in the composition in proportions which form a paste which has a consistency which enables it to be readily spread on a surface to be cleaned, waxed and polished by hand-rubbing, for example, with a soft cloth. The silicone oil is contained in the composition in an amount which is sufficient on one hand, to cause a rejection of the particles of the abrasive therein, and the particles of grime and the pigment removed from the surface which is cleaned to be rejected from the film of wax deposited on the surface during the cleaning and waxing operation, but which, on the other hand, is insufficient to cause the wax film to have a greasy appearance after it has been fully buffed to develop its gloss.

When this composition is rubbed on a surface the abrasive removes from the surface the dirt, grime, and the pigment particles of the finish which are exposed due to the chalking of the surface. As rubbing is continued the wax is deposited on the surface as a continuous film as the solvent evaporates from the composition and the abrasive is rejected from the wax film due to its content of the silicone oil. The particles of the abrasive, pigment, and grime laying on the surface of the wax film can then be readily removed therefrom, simply by wiping it off with a cloth to leave a wax film having the same high luster as that deposited on a pre-cleaned and pre-polished surface by a composition not containing an abrasive material.

The following formulation is generally illustrative of the composition in accordance with this invention:

| | Percent by weight |
|---|---|
| Polishing wax or wax mixture | 11 |
| Abrasive | 20 |
| Silicone oil | 2 |
| Organic solvent | 67 |

The content of the polishing wax, or wax mixture included in this composition falls within the range of about 3% to about 35%, by weight, and preferably within the range of about 6% to about 20%, by weight. The content of the abrasive falls within the range of about 1% to about 40%, by weight, and preferably within the range of about 15% to about 25%, by weight. The content of the silicone oil preferably falls within the range of about 1.25% to about 8%, by weight. Its solvent content falls within the range of about 36% to about 74%, by weight, and preferably within the range of about 45% to about 67%, by weight. Each of the foregoing percentages are based on the total weight of the four essential ingredients included in my composition. In addition to these four essential ingredients of the composition, it may contain other ingredients, such as the conventional coloring materials, odor imparting or masking agents, water, surface active agents, and other additives.

The polishing wax which I use in this composition, in accordance with this invention, may be a single wax or it may be a mixture of waxes. I prefer to use a mixture of a hard wax with a soft wax. In such a mixture the hard wax imparts durability and high gloss to the final buffed wax film, while the soft wax facilitates the spreading of the composition as a uniform film on the surface being cleaned, polished, and waxed. As stated hereinbefore, the amount of wax included in the composition will fall within the range of about 3% to about 35%, by weight, of the four essential ingredients. The amount used in any given formulation is that required to give a workable paste consistency and will depend upon the nature of the wax or wax mixture used, and amounts in which the other essential ingredients are included in the composition. Thus, when using a large amount of an abrasive and a solvent a small amount of wax may be used and vice versa.

When using a mixture of a hard wax and a soft wax, I prefer to use, for example, about 6% to about 10%, by weight, of a hard wax and about 0.25% to about 5%, by weight, of a soft wax, both based on the total weight of the four essential ingredients of the composition. In general, I prefer to use a mixture of a hard wax and a soft wax in which the hard wax is at least 50%, by weight, of the mixture.

The wax or waxes which I use in the composition, in accordance with this invention, may be either natural or synthetic. When using a mixture of a hard and a soft wax, I use as the hard wax of the mixture, a wax which has a hardness value as determined by the Shore durometer at 25° C. in excess of about 80 and preferably of 90 or more, while I use as the soft wax of the mixture, a wax which has a hardness value less than 80 as determined by the Shore durometer at 25° C. and preferably within the range of about 10 to about 60.

Waxes which are suitable for use in this composition are listed in Table I, together with the hardness value as determined by the Shore durometer at 25° C. of representative lots of each of the various waxes. Of the various hard waxes listed in Table I, I prefer to use carnauba or candelilla wax. Of the various soft waxes listed in that Table, I prefer to use beeswax or a paraffin wax.

TABLE I

| Wax | Shore Durometer Hardness at 25° C. |
|---|---|
| Beeswax: | |
| Refined, ordinary | 65 |
| Yellow, U.S.P | 43 |
| Sun bleached, U.S.P | 66 |
| Carnauba wax | 100 |
| Candelilla wax | 100 |
| Ceresin: | |
| Italian white, m. 158° F | 49 |
| Domestic, m. 185° C | 69 |
| Artificial | 32 |
| Do | 28 |
| Cranberry wax, raw | 100 |
| Esparto wax | 100 |
| "I.G. Wax OP" | 100 |
| "I.G. Wax Z" | 94 |
| Japan wax | 21 |
| Myrtle wax | 78 |
| Montan wax: | |
| Crude black | 98 |
| Bleached yy.-white | 78 |
| "Opalwax No. 10" | 100 |
| Ouricuri wax | 100 |
| Ozocerite, pure white | 53 |
| Palm wax, commercial | 82 |
| Paraffin wax: | |
| American, m. 123/125° F | 50 |
| American, 128/130° F | 54 |
| American, 138/140° F | 68 |
| American, 160/163° F | 82 |
| Asiatic, 128/130° F | 76 |
| "Rezowax A" synthetic | 100 |
| Shellac wax | 95 |
| Spermaceti | 49 |
| Sugar-cane wax, Louisiana, refined | 98 |

The abrasive which I include in the composition, in accordance with this invention, may be any one of the abrasive materials which have heretofore been used in conventional cleaners and polishes for automobile finishes. As already noted, the abrasive or mixture of abrasives used in the composition will fall within the range of about 1% to about 40%, by weight, of the composition. The preferred amount of a given abrasive or mixture of abrasives is determined by its density and its average particle size. It will be appreciated that the beneficial effect of the abrasive appears as soon as any appreciable quantity is added, and that its effectiveness is dependent upon the method by which the composition is applied to a surface. As little as 1%, by weight, shows appreciable cleaning effect when the composition is applied with a buffing machine. However, to be really effective as a cleaner, even when applied with a buffing machine, the composition should contain at least 3%, by weight, of the abrasive. The maximum amount of an abrasive which can be used depends upon the nature of the abrasive. Thus, as much as 40%, by weight, of tripoli may be used with the proper adjustment of the amounts of the other ingredients of the composition and a desirable paste consistency secured. On the other hand, I have been unable to formulate a composition containing as much as 40%, by weight, of diatomaceous earth. In the formulation of a general purpose composition for application by hand, as well as by the use of a buffing machine, I prefer to keep the amount of abrasive used within the range of about 15% to about 25%, by weight.

Abrasives which may be used either singly or in admixture are listed in Table II. Of the various abrasives listed, I prefer to use diatomaceous earth or tripoli and have found that a diatomaceous silica of the California type, as described in chapter 13, page 243, of "Industrial Minerals and Rocks," published by The American Institute of Mining and Metallurgical Engineers, New York, 1937, is particularly satisfactory for this purpose.

TABLE II

*Polishing Abrasive*

| Abrasive | Chemical Composition | Density, gms./cc. |
|---|---|---|
| Calcium Salts: | | |
| Natural chalk | calcium carbonate | 2.71 |
| Ppt'd. chalk lt | ---do--- | 2.8 |
| Ppt'd. chalk heavy | ---do--- | 2.8 |
| Calcium silicate | Synthetic calcium silicate | 1.89–2.31 |
| Clays: | | |
| Bentonite | Hydrated al. silicate | 2.41 |
| China Clay | Aluminum oxide silicone dioxide | 2.60 |
| Feldspar | Potass. al. silicone | 2.6 |
| Pyrophyllite | Hydrated al. silicate | 2.8 |
| Silicas: | | |
| Attapulgite | Magnesium aluminum silicate | 2.45 |
| Colloidal silica Diatomaceous | Silicon dioxide | 2.1 |
| Earth (calcined) | ---do--- | 2.31 |
| Diatomaceous earth | Not calcined | 1.9 |
| Fullers earth | Hydrated Magnesium al. silicate | 2.42–2.50 |
| Pumice | Aluminum silicate | 2.4 |
| Silica amorphous | Silicon dioxide | 2.64 |
| Tripoli | Ferri. al. silicate | 2.15–2.62 |
| Talcs: | | |
| Talc | Magnesium aluminum silicate | 2.70 |
| ---do--- | Magnesium silicate | 2.75 |
| Various: | | |
| Magnesia | Magnesium oxide | 2.9 |
| Rouge | Iron oxide | 5.18 |

The organic solvent which I use in this composition is a mixture of one or more volatile solvents which is compatible with the waxes of the composition when they are molten and which is a solvent for the silicone oil contained in the composition. The hydrocarbon solvents are particularly suitable for use in this composition, and I prefer to use a mixture of solvents having different evaporation rates, to adjust the period over which the solvent evaporates from the composition during its application and therefore the period required for the final wax film to come to its full hardness. For example, I have found that a mixture of 1 part, by weight, of kerosene, with 2 parts, by weight, of mineral spirits is an entirely satisfactory solvent for this purpose. Ordinary commercial kerosene may be used in this mixture, but I prefer one from which the odor and the heavier oil constituents have been removed. Such a kerosene, known as "deobase," is widely used in household fly sprays. Similar hydrocarbon solvents and solvent mixtures, such as the various naphthas and mixtures thereof, can also be used.

The silicone oil which I use in this composition is an organic polysiloxane which is a liquid at ambient temperatures. A polymethyl siloxane having a viscosity within the range of about 4 centistokes to about 1,000 centistokes at 25° C., and the chemical structure disclosed in U.S. Patent 2,614,049 to Swanson, and U.S. Patent 2,626,870 to Cooke, are preferably used in this composition. Such a silicone oil may be represented by the following chemical formula in which siloxane units are joined together to form chains of varying lengths:

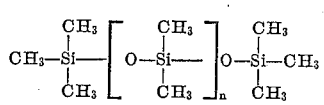

I have found that the silicones represented by the foregoing formula quite effectively eliminate solid particles in the use of this composition. However, I may use other polymerized siloxanes in which the methyl groups of the foregoing formula are replaced with other organic groups. In general, I prefer to use a polymethyl siloxane, as compared with a polyethyl siloxane or a siloxane carrying higher molecular weight organic groups, since it is the least compatible with waxes and is the most efficient in causing the rejection of the particles of abrasive and pigment from the wax film.

I may use mixtures of the polymerized siloxanes which carry different organic groups, and I may use mixtures of two or more polymerized siloxanes of different degrees of polymerization and, hence, of different molecular weights. In mixtures of polymerized siloxanes, I may include polymerized siloxanes having viscosities above 1,000 centistokes at 25° C., provided the mixture as a whole has a viscosity not greater than 1,000 centistokes. However, care must be used as to the quantity of a high molecular weight, for example, one having a viscosity of 30,000 centistokes, which is used since the higher molecular weight materials have a tendency to cause the wax film to have a greasy appearance as their percentage in the composition is increased.

As already noted, the silicone oil functions to cause the rejection of the particles of abrasive, as well as the particles of grime and pigment removed from the surface by the cleaning operation from the wax film as it hardens on the surface and permits the easy removal of these undesired components from the surface of the wax film. This functioning of the silicone appears with as little as 0.5%, by weight, of the silicone present and is noticeable with 1.25%, by weight, of the silicone present in the composition. It is appreciable with as much as 1.50%, by weight, included therein. As the amount of the silicone is increased to 2%, by weight, and on to as high as 8%, by weight, of the composition, the ease of application of the composition to the surface to be cleaned, its cleaning of the surface, and the ease of removal of the residue of particles of the abrasive, pigment and grime from the wax film are progressively improved. Althouh I may include as much as 18%, by weight, of silicone oil in my composition, a quantity in excess of about 8%, by weight, is unnecessary and undesirable from a cost standpoint since it is the most expensive essential ingredient of the composition.

It is desirable to correlate the amount of silicone oil included in the composition with the amount of abrasive used, e.g., when doubling the abrasive content it is desirable to approximately double the amount of silicone oil used. The particular percentage of the silicone oil within the range of about 1.25%, by weight, to about 8%, by weight, and the amount of abrasive included in the composition can be adjusted to take care of mild conditions on the surface of, for example, an automobile by the use of amounts of these materials within the lower ends of their respective ranges. Similarly, the composition may be formulated to take care of severe conditions of chalking of a finished surface, by using larger amounts of the silicone oil and the abrasive within the upper ends of their respective ranges. I have found that I usually prefer to use an amount of the silicone oil within the range of about 2%, by weight, to about 6%, by weight, of the composition.

As noted hereinbefore, the composition in accordance with this invention may contain, in addition to its four essential ingredients, various additives which are well known in the formulaton of paste waxes. Water is one of the additives which contributes desirable properties to the composition, when emulsified in the composition to produce a water-in-oil type of dispersion and I may include as much as 30%, by weight, of water in the composition. When adding water to the composition, I may decrease the amount of organic solvent which I include therein and it is by the inclusion of water that I can formulate a mixture having the consistency of a paste with as little as 36%, by weight, of solvent based on the total weight of the four essential ingredients contained therein.

When including water in the composition it is essential that the water be uniformly dispersed as an internal phase. The smaller quantities of water may be mechanically dispersed as an internal phase in the composition while it is in the molten state by known methods without including an emulsifier in the composition. When using the larger amounts of water it is necessary to include a surface active agent in the composition which will function to keep the water dispersed as an internal phase and it is desirable to use an emulsifying agent which tends to favor the formation of a water-in-oil type of dispersion. A wide variety of such emulsifying agents are well known to the art. The requirement that the water be dispersed as an internal phase in the matrix of wax, abrasive, organic silicone, and silicone oil imposes a definite limitation on the amount of water which can be included, since an excessive amount of water will either cause a phase inversion or a separation of the water from the paste. A separation of water from the paste matrix is undesirable. A phase inversion to form an oil-in-water dispersion renders the composition useless for its intended purpose.

To prepare this composition, I heat the wax or mixture of waxes to a temperature above its melting point, and while the wax is molten, intimately admix the remaining ingredients of the composition into the molten wax. In its preparation it is necessary to uniformly disperse the abrasive throughout the composition and to uniformly wet it with the organic ingredients of the composition.

This composition is illustrated by the specific embodiments given by the following examples:

EXAMPLE 1

2% silicone oil (dimethyl polysiloxane)
20% diatomaceous earth
67% of a mixture of mineral spirits and kerosene
8.5% carnauba wax
2.5% beeswax

EXAMPLE 2

4% silicone (dimethyl polysiloxane oil)
20% diatomaceous silica

65% mixture of mineral spirits and kerosene (2 to 1 mineral spirits to kerosene)
9% carnauba wax
2% beeswax

EXAMPLE 3

6% silicone (dimethyl polysiloxane oil 200 centistokes viscosity at 25° C.)
18% diatomaceous silica
65% mixture of mineral spirits and kerosene (2 to 1 ratio)
10% carnauba wax
1% beeswax

EXAMPLE 4

8% silicone (dimethyl polysiloxane oil)
20% diatomaceous silica
61% mineral spirits
9% carnauba wax
2% beeswax The effectiveness of the silicone oil in improving the gloss of the wax film of a paste wax composition containing any abrasive, as well as improving other properties of the composition, is fully illustrated by the data given by Table III, which was secured by a direct comparsion of the following wax compositions:

|  | Composition A, percent by weight | Composition B, percent by weight |
|---|---|---|
| Vegetable waxes | 8.4 | 8.4 |
| Hydrocarbon waxes | 2.0 | 2.0 |
| Silicone oil | 4.1 | |
| Naphtha solvents | 61.8 | 65.9 |
| Abrasive | 22.7 | 22.7 |
|  | 100.0 | 100.0 |

It will be noted that composition B differs from composition A, in that the silicone oil of composition A has been replaced with a like proportion of naphtha solvent. The following abrasives were used in these compositions A and B, and the compositions containing each of these respective abrasives directly compared to secure the data given by Tables III and IV:

Diatomaceous earth _____ "Snow floss" brand.
Pumice _____ Powdered XXXX grade.
Tripoli _____ Air-float fine.
Silica _____ Air-float fine "smoke" grade.

TABLE III

|  | Example 5 | | Example 6 | |
|---|---|---|---|---|
|  | A | B | A | B |
| Composition | Diatomaceous earth | | Pumice Stone | |
| Abrasive | with silicone | no silicone | with silicone | no silicone. |
| Dispersion | uniform no clots or balling. | uniform slight balling. | slight balling | slight balling. |
| Consistency when at 200° F | viscous liquid gels on cooling. | more viscous than A. | thin liquid | sl. more viscous than A. |
| Application Properties: | | | | |
| Spreading | Exc | Good | Exc | Good. |
| Abrasion of oxidized paint film. | Exc | Fair | Exc | Poor. |
| Removal after drying 2 hours dry. | Exc | Good | Good | Fair. |
| Buffing ease | No drag | Sl. drag | Sl. drag | Drags more than A. |
| Gloss (Visual) | Exc | Good | Hazy | Cons. hazy. |
| Texture of Surface | Non-oily slick | Non-oily slick | Non-oily slick | Oily film. |
| Removal after drying 24 hours dry. | Exc | Good | Sl. drag | Poor. |
| Buffing ease | Exc | Sl. drag | Good | Do. |
| Gloss (Visual) | Exc | Good | Sl. haze | Cons. haze. |
| Texture of Surface | Non-oily slick | Non-oily slick | Non-oily slick | Mars. |

TABLE IV

|  | Example 7 | | Example 8 | |
|---|---|---|---|---|
|  | A | B | A | B |
| Composition | Airfloat Tripoli | | Fine Silica | |
| Abrasive | With silicone | No silicone | With silicone | No silicone. |
| Dispersion | Uniform, no clots or balling. | Uniform, no clots or balling. | Uniform, no clots or balling. | Uniform, no clots or balling. |
| Consistency when at 200° F | Viscous liquid | Viscous liquid | Viscous liquid | Viscous liquid. |
| Application properties: | | | | |
| Spreading | Exc | Good | Exc | Exc. |
| Abrasion of oxidized paint film. | Good | Poor | Exc | Poor. |
| Removal after drying 2 hours dry. | do | Fair | Exc | Good. |
| Buffing ease | Sl. drag | Cons. drag | No drag | Sl. drag. |
| Gloss (visual) | Sl. haze | Cons. haze | Exc | Sl. haze. |
| Texture of surface | Non-oily film | Mars | Non-oily slick | Non-oily mars. |
| Removal after drying 24 hours dry. | Sl. drag | Poor | Exc | Sl. drag. |
| Buffing ease | Good | do | Exc | Poor. |
| Gloss (visual) | Sl. haze | Cons. haze | Exc | Cons. haze. |
| Texture of surface | Non-oily slick | Mars | Non-oily slick | Mars. |

It will be noted from the data of Tables III and IV, that in the case of each of the four abrasives used, the presence of the silicone oil in the composition caused the abrasive to be more effective in its abrasion of an oxidized paint film and caused the abrasive and pigment particles to be easier to remove from the waxed surface, both after two hours' drying of the composition and after twenty-four hours' drying. Furthermore, the silicone oil made the compositions easier to buff and improved the gloss of the final wax film.

Hereinbefore, I have mentioned my belief that the effect of the silicone oil is due to a selective absorption, or to a surface adsorption of the silicone oil by the abrasive, combined with the incompatibility of the silicone oil with the wax of the composition. The silicone oil is soluble in the volatile organic solvent of the composition and, I believe migrates to the solid particles of abrasive, pigment and grime in the wax film as the solvent evaporates from the film. The data of Tables III and IV give support to this belief.

Of the four pigments used in the compositions shown in Tables III and IV, diatomaceous earth and the fine silica have high oil absorption values (Gardner-Coleman), while the pumice stone and tripoli have considerably lower oil absorption values. Therefore, the diatomanceous earth and the fine silica can be expected to absorb or adsorb the silicone oil more tenaciously than the pumice or the tripoli. An examination of the data of Tables III and IV, shows that with the concentration of silicone oil use (4.1%, by weight), the wax films were readily buffed to a film of excellent gloss, while in the case of the compositions containing the less absorptive pumice and tripoli, the silicone oil at the concentration used did not effect a complete elimination of the solid particles from the wax film, as indicated by the residual haze of the film, although its presence did effect a considerable improvement. Such residual haze can be eliminated by the use of a higher proportion of the silicone oil.

I have endeavored to fully disclose my invention by advancing theories as to the mechanism by which the silicone oil in my composition gives it materially improved performance, as compared with prior art compositions. The data I have accumulated in working extensively with these compositions appears to fully support these theories. However, it will be fully understood that my invention, as described by the claims which appear hereinafter, is not restricted to any theory as to the mechanism by which the silicone oil gives my composition its advantageous properties.

In the foregoing, I have specifically exemplified the compositions in accordance with this invention and mentioned alternative materials which I may use in the formulation of the of the compositions for the purpose of fully illustrating the invention, but it will be understood that alternative materials may be used in these compositions and variations made in the details of the formulations without deviating from the spirit of my invention, or the scope of the following claims.

This application is a continuation-in-part of my co-pending application, Serial No. 592,719, filed June 21, 1956, which is, in turn, a continuation-in-part of my application Serial No. 356,113, filed May 19, 1953, which was pending on June 21, 1956, both now abandoned.

I claim:

1. A paste wax composition adapted to be rubbed onto a finished surface to remove therefrom particles of grime and of pigment exposed by chalking, to clean and polish the surface of the finish, and to deposit a wax film thereon which can be buffed to a glossy finish, consisting essentially of about 6% to about 15% of a polishing wax, about 15% to about 25% of an abrasive, about 45% to about 67% of an organic solvent, and about 1.5% to about 8% of a dimethyl polysiloxane, each of the said percentages being by weight of the total weight of these four ingredients of the composition which forms at least the major part of the composition.

2. A paste wax composition adapted to be rubbed onto a finished surface to remove therefrom particles of grime and of pigment exposed by chalking, to clean and polish the surface of the finish, and to deposit a wax film thereon which can be buffed to a glossy finish, consisting essentially of 1.5% to 8% of a dimethyl polysiloxane, about 15% to aboue 25% of diatomaceous earth, about 45% to about 67% organic solvent for the dimethyl polysiloxane, about 6% to about 10% carnauba wax and about ¼% to about 5% beeswax, each of the said percentages being by weight of the total weight of these five ingredients of the composition which forms at least the major part of the composition.

3. A paste wax composition adapted to be rubbed onto a finished surface to remove therefrom particles of grime and of pigment exposed by chalking, to clean and polish the surface of the finish, and to deposit a wax film thereon which can be buffed to a glossy finish, consisting essentially of about 2% dimethyl polysiloxane, 20% diatomaceous earth, about 67% of a mixture of mineral spirits and kerosene, about 8.5% carnauba wax and about 2.5% beeswax, each of the said percentages being by weight of the total weight of these six ingredients of the composition which forms at least the major part of the composition.

4. A paste wax composition adapted to be rubbed on to a finished surface to remove therefrom particles of grime and of pigment exposed by chalking, to clean and polish the surface of the finish and to deposit a wax film thereon which can be buffed to a glossy finish which consists essentially of a polishing wax in amount within the range of about 3% to about 35%, an abrasive in amount within the range of about 1% to about 40%, a dimethyl polysiloxane in amount within the range of about 1.25% to about 8%, by weight, a water-immiscible, volatile organic solvent within the range of about 36% to about 74%, by weight, each of the said percentages being by weight of the total weight of these four ingredients in the composition, and water in an amount not in excess of about 30% by weight, of the entire composition, dispersed as an internal phase in the composition, the said ingredients being in relative proportions which give a paste consistency at ambient temperatures which adapts the composition to be rubbed on to a surface.

5. A paste wax composition adapted to be rubbed on to a surface to remove therefrom particles of grime and of pigment exposed by chalking, to clean and polish the surface of the finish and to deposit thereon a wax film, which consists essentially of about 3% to about 35%, by weight, of a polishing wax mixture, about 1.25% to about 8%, by weight, of a dimethyl polysiloxane having a viscosity within the range of about 4 to about 1000 centistokes at 25° C., about 1% to about 40%, by weight, of diatomaceous earth, and about 36% to about 74%, by weight, of a volatile hydrocarbon solvent, each of the said percentages being by weight of the total weight of these four ingredients in the composition, the said ingredients being in relative proportions which give a paste consistency at ambient temperatures which permits the composition to be rubbed on to a surface, provides a cleaning action by the abrasive and a rejection of the abrasive from the composition by the dimethyl polysiloxane when spread on a surface.

6. A paste wax composition adapted to be rubbed on to a surface to remove therefrom particles of grime and of pigment exposed by chalking, to clean and polish the surface of the finish, and to deposit thereon a wax film, which consists essentially of a polishing wax mixture, in amount within the range of about 6% to about 15%, an abrasive in amount within the range of about 15% to about 25%, a dimethyl polysiloxane having a viscosity within the range of about 4 to about 1000 centistokes at 25° C., in amount within the range of about 1.25% to about 8%, a volatile hydrocarbon solvent in amount within the range of about 36% to about 74%, by weight, each of the said percentages being by weight of the total weight of these four ingredients in the composition, and water in amount not in excess of about 30% by weight of the entire composition, dispersed as an internal phase in the composition, the said ingredients being in relative proportions which give a paste consistency at ambient temperatures which adapts the composition to be rubbed on to a surface.

7. A paste wax composition adapted to be rubbed on to a finished surface to remove therefrom particles of grime and of pigment exposed by chalking, to clean and polish the surface of the finish, and to deposit a wax film thereon which can be buffed to a glossy finish, consisting essentially of about 6% to about 15% of a polishing wax, about 15% to about 25% of a mixture of abrasives, about 45% to about 67% of an organic solvent and about 1.5% to about 8% of a dimethyl polysiloxane, each of the said percentages being by weight of the total weight of these four ingredients of the composition which form the major part of the composition.

8. A paste wax composition adapted to be rubbed onto a finished surface to remove therefrom particles of grime and of pigment exposed by chalking, to clean and polish the surface of the finish and to deposit a wax film thereon which can be buffed to a glossy finish which consists essentially of a polishing wax in amount within the range of about 3% to about 35%, an abrasive in amount within the range of about 1% to about 40%, a dimethyl polysiloxane in amount within the range of about 1.25% to about 8%, by weight, and a water-immiscible, volatile organic solvent within the range of about 36% to about 74%, by weight, each of the said percentages being by weight of the total weight of these four ingredients in the composition, the said ingredients being in relative proportions which give a paste consistency at ambient temperatures which adapts the composition to be rubbed onto a surface.

References Cited in the file of this patent

UNITED STATES PATENTS

| | | |
|---|---|---|
| 2,597,871 | Iler | May 27, 1952 |
| 2,614,049 | Swanson | Oct. 14, 1952 |
| 2,812,263 | Geen et al. | Nov. 5, 1957 |

FOREIGN PATENTS

| | | |
|---|---|---|
| 407,028 | Great Britain | Mar. 2, 1934 |
| 695,070 | Great Britain | Aug. 5, 1953 |